Patented Jan. 29, 1952

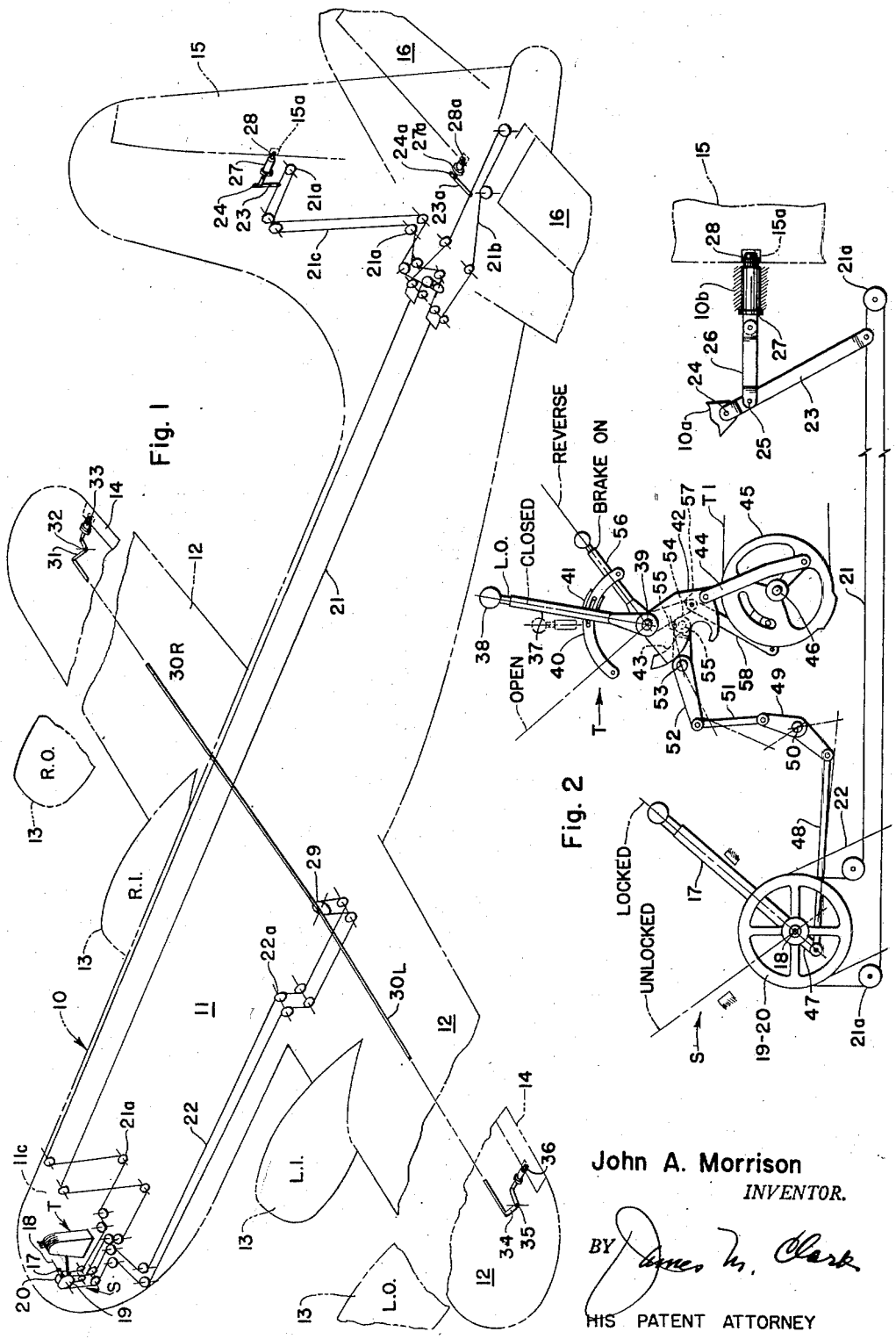

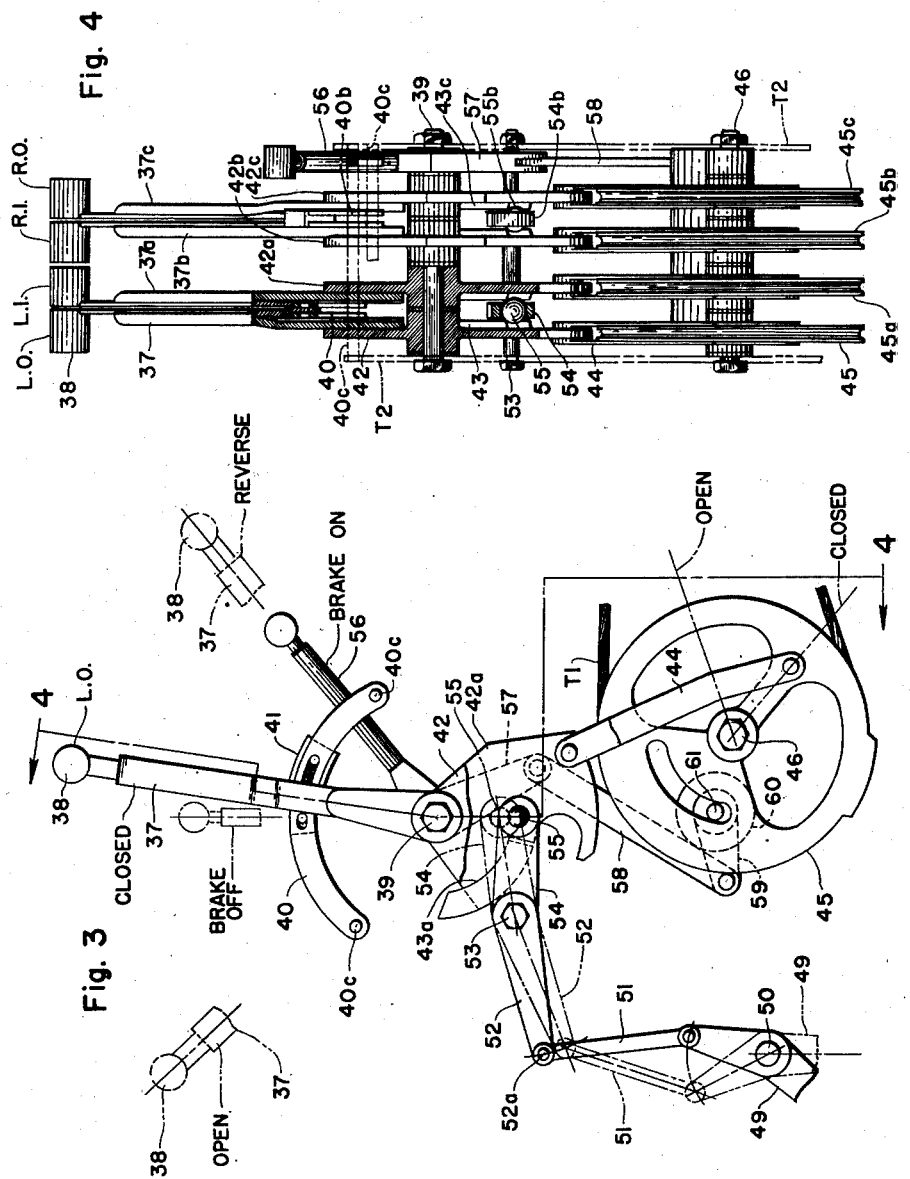

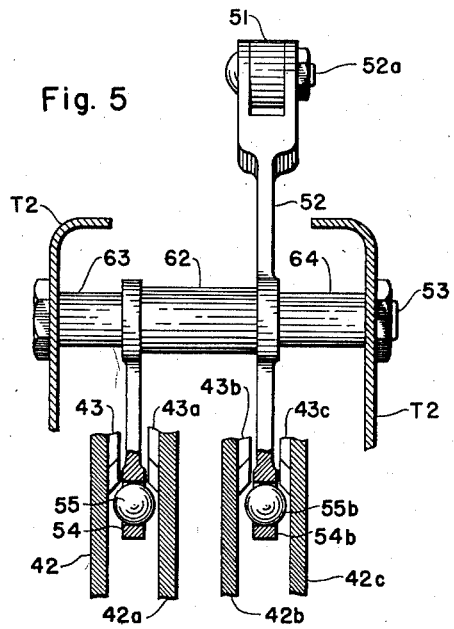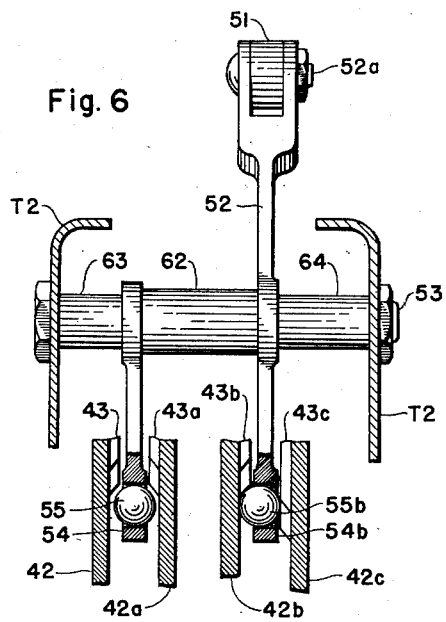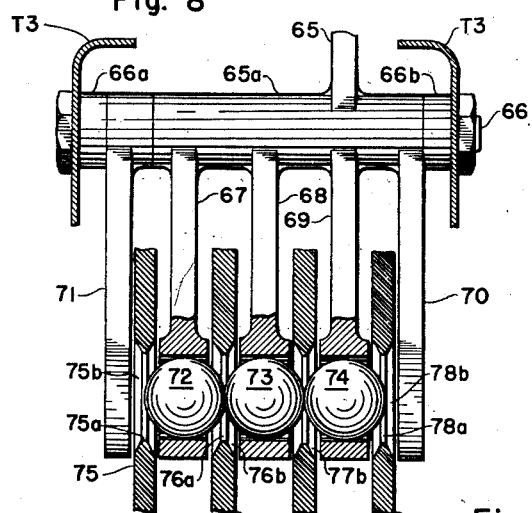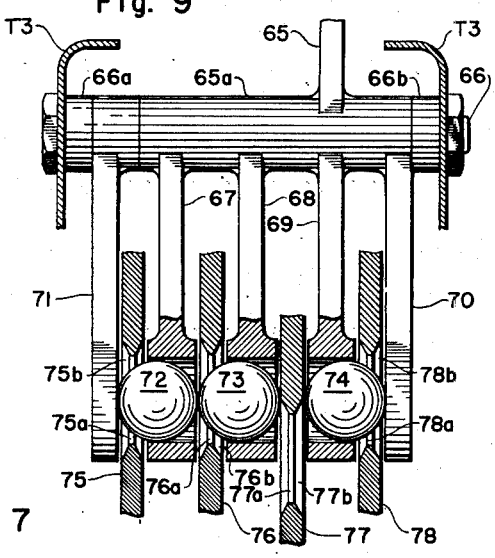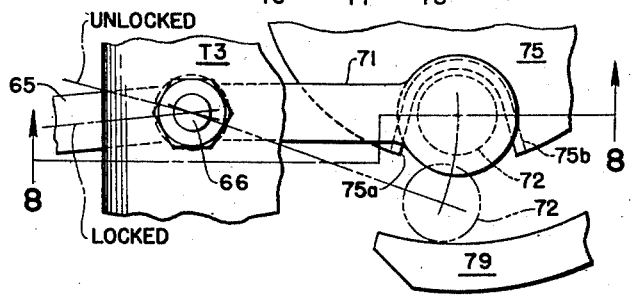

2,584,038

UNITED STATES PATENT OFFICE 2,584,038

AIRCRAFT CONTROL LOCK

John A. Morrison, Seattle, Wash., assignor to Boeing Airplane Company, a corporation of Delaware Application March 9, 1948, Serial No. 13,879

20 Claims. (Cl. 244—83)

The present invention relates to aircraft controls and more particularly to improved interlocking means between the engine throttle controls and the flight controls of the aircraft.

In the operation of aircraft upon the ground, either during taxiing, the engine warm-up period prior to take-off or even while the airplane is standing idle or parked upon the ground, it is desirable to lock all of the control surfaces in order to prevent damage thereto due to excessive vibration, wind gusts or other causes. It is, of course, extremely important that the pilot release these control surface locks before the airplane is taken off the ground. A number of accidents have been caused by the failure of the pilot, or other attendant, to release one or more of these control surface locks and, obviously, the results of such accidents may be of very serious nature.

Numerous efforts have been made in the past to provide simple, yet foolproof control surface locking devices which would indicate to the pilot that the surfaces were locked and in certain installations such harness devices prevented the seating or positioning of the pilot to automatically warn him of the presence of the harness or locking means. Other prior control surface locks have been applied both to the control mechanism for the surface as well as externally upon the control surface itself. Efforts have been made to improve these prior devices such as by providing a line and a weight upon the ground, or by interconnection between the surface controls and the parking brakes, as well as by various indicating and signalling means to warn the pilot before take-off that the control surfaces were still locked.

An effective means of preventing the take-off of an airplane under these conditions is the provision of an interlock or a blocking means which prevents opening the engine throttle while the control surface locks are applied. However, it is necessary that the engines be warmed-up prior to take-off at a time when the control surfaces may still be in their locked condition to prevent damage from the slip-streams of the rotating propellers. The present invention is directed to improvements in such devices and provides an interlock between the throttle and surface lock controls by means of which only a portion of the engines of a multi-engine aircraft are permitted to be revved-up at the same time while the control surfaces are in the locked condition, that portion of the available power being insufficient to lift the aircraft into the air. The presently improved arrangement, accordingly, permits warming-up of the individual motors in accordance with the customary practice prior to take-off but prevents the opening of the throttles of all of the engines necessary for take-off while the control surface locks may be in their applied condition. The improved arrangement of the present invention is accordingly such that when the control surfaces are locked the pilot cannot advance all of the engine throttles and will thus be definitely reminded to unlock the surfaces before taking-off.

It is, accordingly, a major object of the present invention to provide an improved interlocking or blocking arrangement between the control surface locking mechanism and the throttle controls of a multi-engined airplane such that when the control surfaces are locked the pilot is prevented from advancing all of the engine throttles and will be reminded to unlock the control surfaces prior to take-off. It is a further object to provide an improved safety interlocking system whereby the pilot may individually warm-up a portion of the motors of a multi-engined airplane while the gust or surface locks are applied and at a time when the remaining engines can be operated at an idling speed. A further object resides in the provision of an arrangement whereby either engine of a twin-engined airplane can be operated at full throttle while the control surfaces are locked but wherein the operation of the other or remaining motor, which would be necessary for the take-off of the airplane, would be blocked or prevented and the pilot reminded of the fact that his surfaces were locked.

It is a similar objective of the present invention to provide an interlocking arrangement for a four-engined airplane in which but one engine on either side of the airplane is permitted to be warmed-up at full throttle while the remaining engine on that side is caused to be idled and to prevent the advance of all four engine throttles simultaneously, to thereby remind the pilot to unlock his control surfaces. It is a further object of the present invention to provide an improved interlocking mechanism between the control surface locks and the engine throttles which will permit full freedom of the airplane in taxiing, ground maneuvering and engine warm-up operations with the control surfaces locked, but which at the same time will prevent take-off with the surfaces in the locked condition. Other objects and advantages of the present invention will become apparent to those skilled in the art after reading the present description, taken together with the accompanying drawings, forming a part hereof, in which:

Figure 1 is a diagrammatic perspective view of an airplane showing a control surface locking system and a throttle control stand;

Figure 2 is a side elevational view of a throttle control, a surface locking control and a form of the improved interlocking mechanism;

Figure 3 is an enlarged detail view of the throttle control mechanism shown in Figure 2;

Figure 4 is a rear elevational view, partly in cross-section, showing the throttle control mechanism taken along 4—4 of Figure 3;

Figure 5 is an enlarged detail view of part of the interlocking mechanism shown in Figure 4;

Figure 6 is a similar view of the mechanism portion shown in Figure 5 showing certain of the movable parts displaced;

Figure 7 shows a side elevational view of a portion of a modified form of the present mechanism;

Figure 8 is an enlarged detail view of a portion of the mechanism shown in Fig. 7 as taken along 8—8 thereof; and Figure 9 is a similar view of the mechanism shown in Figure 8 with one of the throttles in an advanced position.

Referring now to Fig. 1, there is shown a multi-engined airplane 10 having a fuselage portion 11 and laterally extending wings 12. Upon the latter are mounted a plurality of power plant units or engines 13 which may be of the conventional internal combustion type driving tractor propellers or the airplane may be powered by turbo-prop, turbo-jet or other improved type power plants. For purposes of the present description there has been shown in phantom lines in Fig. 1, an airplane 10 powered by four power plant units 13 and for convenience in designating the respective units the letters LO, LI, RI, and RO designate respectively the left outboard, left inboard, right inboard and right outboard units. While an airplane powered by four power plant units has been selected for illustrating the present invention, it will be understood that the present improvements are equally adapted to airplanes having two or more power plant units and are not limited to the specific arrangement which is herein shown and described.

The airplane is provided with sets of conventional control surfaces comprising the ailerons 14 for lateral control, the rudder 15 for directional control and the elevators 16 for dive control. While these control instrumentalities are disclosed at the wing outer portions and at the empennage respectively, it will be understood that the present invention is equally applicable to aircraft having two instead of three sets of control surfaces, as well as flying wing, tail first or other type aircraft. The nose portion of the aircraft is provided with a pilot or control compartment 11c within which the numerous control instrumentalities are provided for the operation of the airplane. In Fig. 1, however, there is indicated diagrammatically only those two of the controls with which the present invention is concerned, namely the control surface locking system indicated by the letter S and the throttle control bank or stand T for the control of the several power plant units. As indicated in this figure, the throttle control bank T is centrally disposed between the pilot and co-pilot positions and is positioned slightly aft of the control surface locking mechanism S. The throttle control T is connected in a manner well known in the art with the throttle valves of the respective engines 13, in the present instance by sets of cables indicated by the letter T1 as shown in Figs. 2 and 3. For purposes of clarification, these operating cables to the respective engine throttles have been omitted from the diagrammatic showing in Fig. 1 and only the cables comprising the control surface locking system S have been indicated in this figure.

Referring now more particularly to Fig. 2, the numeral 17 indicates the control surface locking lever for the ailerons 14, the rudder 15 and the elevators 16. The lever 17 is fixed to the pivotally mounted shaft 18 to rotate the adjacent sheaves 19 and 20, with which it is adapted to rotate about the axis of the shaft 18. The sheave 20 controls the locking of the movable tail surfaces, such as the rudder 15 and the elevator 16, and the sheave 19 controls the locking of the ailerons 14. Both sheaves 19 and 20 operate simultaneously with the movement of the lever 17 and accordingly all of the control surfaces are either locked or unlocked concurrently.

The cable 21 extends around the sheave 20 downwardly and rearwardly, around the numerous guide sheaves 21a aft through the fuselage to the tail portion where it is divided into two separate runs, one run 21c extending to the rudder 15 and the other run 21b to the elevators 16. Fig. 2 diagrammatically illustrates the cable extending to the locking mechanism for the rudder surface 15 only. The lever 23 is pivotally mounted upon the fixed aircraft structure 10a by means of the pivot 24 and at its outer free terminal it is attached to the cable 21. Intermediate its terminal and adjacent the pivot 24, it is connected by means of the pivot pin 25 to the link 26 which in turn is pivotally connected at its other end to the pin 28 slidable within the cylindrical sleeve 27, which is anchored to the fixed structure within the vertical fin 10b. The leading edge of the surface 15 is provided with a recess 15a which is aligned with the axis of the pin 28 in the neutral position of the rudder such that movement of the lever 17 into its locked or full line position, as shown in Fig. 2, causes counterclockwise rotation of the lever 23 about its pivot 24 imparting rearward movement to the link 26, moving the pin 28 into the recess 15a to thereby lock and prevent any rotation of the rudder 15 about its vertical axis. The elevator surfaces 16 are similarly locked in their neutral position by the same rearward movement of the lever 17 which causes similar movement of the cable run 21b attached to the lever 23a which is pivotally mounted at 24a to fixed structure and has linked thereto the locking pin 28a engaging a similar recess in the elevator leading edge, the pin 28a being guided and translatable within the sleeve 27a which is also fixedly mounted within the aircraft structure.

The cable 22 extends around the sheave 19, disposed adjacent the above mentioned sheave 20, and extends downwardly and rearwardly to rotate the actuating disc 29 within the fuselage portion transversely of the wing 12. To the disc 29, there is pivotally attached the laterally or spanwise extending push-pull rods 30L and 30R which extend outwardly into the wing portions to the left and right, respectively, of the fuselage 11. The outer terminal of the push-pull rod 30R is pivotally connected to a bell-crank 31 mounted upon the pivot 32, in turn linked to the locking pin 33, which engages a recess in the leading edge of the aileron 14. Similarly, the push-pull rod 30L is pivotally connected at its outer extremity to the bell-crank 34 which is pivotally mounted at 35 upon the wing structure, and has its opposite terminal pivotally linked to the locking pin 36 which engages a recess in the leading edge of the adjacent aileron 14.

It will also be understood that the airplane shown and described will be provided with a conventional control system whereby each of the control surfaces may be adjusted in flight for the control of the airplane, and which surfaces may be moved into their neutral positions in which they are locked by appropriate movement of the control surface locking lever 17. It will accordingly be seen that forward movement of the locking lever 17 will cause retraction of the pins 28, 28a, 33 and 36 from their respective recesses in the control surfaces 15, 16 and 14, respectively, following which the surfaces will be subject to movement by the pilot through the conventional control column and rudder pedals (not shown). Similarly, rocking of the lever 17 in the opposite direction will cause each of the locking pins 28, 28a, 33 and 36 to be extended rearwardly to engage the respective recesses in each of the control surfaces when the latter are disposed in their normal or neutral positions.

The throttle control bank T, diagrammatically shown in Fig. 1, may now be referred to in Fig. 2, and will be seen to include a plurality of throttle levers 37 having upper terminal handle portions 38 and pivotally mounted upon the fixed shaft 39. It will be understood that there is a throttle lever for each power plant unit and each throttle is preferably similar and complementary in construction with the others, but each is arranged to be separately and individually rotated as desired about the common pivot shaft 39. In Fig. 2, the nearest lever LO will be described as being typical of the other three corresponding to the engines LI, RI and RO. Each lever is movable along a quadrant or segment 40, which is preferably provided with a spring-loaded stop, as indicated at 41. The lower portion of each lever extends beyond the axis of the shaft 39 having an extension portion 42 on which there is integrally formed the arcuately shaped locking cam surface 43. To the lower portion 42 of each lever there is pivotally connected an actuating link 44 which in turn is pivotally attached to the throttle drum 45 rotatable about the shaft 46. The sheave or drum 45 is engaged by the rearwardly extending cables T1 which extend to the throttle valve of the engine or the power plant unit controlled by the respective lever 37. It will, accordingly, be noted that when the lever 37 is moved forwardly from its full line "closed" position of Fig. 2 into the forward "open" position the counterclockwise rotation of the extending portion 42 will be transmitted to the throttle drum 45 by the link 44 and the cable T1 will be moved in the appropriate direction to open the throttle of the corresponding engine unit. The lever 37, can, however, only be rotated into its "open" position when the control surfaces are unlocked, the lever being shown blocked in Fig. 2 by the interlocking mechanism about to be described.

Returning now to the control surface locking lever 17, as shown in Fig. 2, it will be noted that this lever also has a lower extending portion 47 which is pivotally connected to a rearwardly extending push-pull rod 48. The rearmost terminal of the rod 48 is pivotally connected to a terminal of a bell-crank lever 49 rotatable about the pivot 50 and having its opposite terminal portion pivotally connected to a link 51. The latter is pivotally connected to a forwardly and downwardly extending arm of a bell-crank 52 which is pivotally mounted at 53 and carries a rearwardly extending arm 54 having an apertured portion adapted to receive a spherical interlocking ball 55. It will, accordingly, be apparent from the foregoing description and the diagrammatic showing of Fig. 2 that when the lever 17 is moved into its "locked" position, the interlocking arm 54 has moved the ball 55 downwardly into the path of the interlocking cam surface 43, thereby preventing forward or advancing movement of the throttle lever 37 into its "open" position. It will be also noted from the mechanism shown and described that when both the locking lever 17 and the throttle lever 37 are in their forward unlocked and opened positions respectively, it is not possible to lock the control surfaces until the throttle lever 37 has first been returned to the throttle "closed" position. As shown in both Figs. 2 and 3, the throttle pivot 39 also has mounted for pivotation thereon the throttle brake lever 56 having a downward and rearward extension portion 57 to which there is pivotally connected the link 58. The latter is in turn pivotally connected to the lever 59 forming a part of the throttle brake screw 60 rotatable about the pivot 61 and by means of which the throttle drum or multiple sets of sheaves 45 may be locked in any adjusted position.

Figs. 3 and 4 show that portion of the throttle control mechanism and the interlocking elements which are adjacent to and housed within the throttle control stand T, being shown in somewhat greater detail than in the previous figure. As shown in Fig. 4, the throttle handles 37, 37a, 37b and 37c have also been designated LO, LI, RI and RO in the same relative relationship looking forwardly as the four engines shown in Fig. 1, namely, left outboard, left inboard, right inboard and right outboard. It will also be noted from this figure that the two engines on the left side of the airplane have their respective throttles controlled by the levers indicated as 37 and 37a and that these levers are substantially symmetrically disposed about the intermediate interlocking arm 54. The several throttle control knobs 38 such as LO and LI are arranged, in the complementary left and right pairs, to form T-shaped grip portions in order that the pair of engines on each of the airplane can be adjusted simultaneously, but when desired they can also be separated such that one or the other lever of each pair may be advanced or retarded to a greater extent than the other. The grip portions 38 are slidable within the main lever portions 37 with a spring-pressed detent arranged to meet the spring loaded stop 41 mounted on the quadrant 40, this detent being retractable by pulling outwardly on the control knob 38 against the spring pressure to thereby permit drawing the throttle lever rearwardly into or toward the reverse pitch position of the propellers as indicated in Figs. 2 and 3. The throttle control and interlocking mechanism shown in Figs. 3 and 4 is housed within the casing sides T2 which are laterally spaced and retained in position by the pivot shafts 39, 46 and 53, as well as the mounting rods 40c at the ends of the quadrants 40 and 40b.

Referring now to Figs. 5 and 6, these enlarged scale views are taken through the extended lever portions 42, 42a, 42b and 42c looking downwardly upon the interlocking arms 54 and 54b carrying the interlocking balls 55 and 55b. In these figures, the pivotal connection 52a between the link 51 and the interlocking bell-crank 52 is shown at the upper part of each figure, and sleeves or spacers 62, 63 and 64 are coaxially disposed on the pivot shaft 53. These spacer sleeves serve to maintain the bell-crank interlocking arm 52—54 in its proper position intermediate the lever extension 42b and 42c, as well as to position its counter part 54 which, however, is a simple lever being keyed or otherwise fixed to rotate with the bell-crank lever 52—54, about the axis of the pivot 53. In other words, the elements 52—54b, 54, 55, 55b and 62 all rotate in unison as the lever 17 is operated. It will be noted in Fig. 5 that the control surface locking handle has been rotated to its locked position in which the arms 54 and 54b, carrying the interlocking balls 55 and 55b, have been moved into the paths of the interlocking camming surfaces 43, 43a, 43b and 43c. In the position of the interlocking balls shown in this figure, it is impossible to advance both throttles of either said pair of engines. If simultaneous rotation, for example, of the levers 42 and 42a were attempted, the interlocking surfaces 43 and 43a would be blocked by the ball 55 which is interposed in their arcuate paths as more clearly shown in Fig. 3. Similarly, the position of the interlocking ball 55b would prevent simultaneous advance of the levers 42b and 42c corresponding to the two engines on the opposite or right side of the airplane.

It is, however, possible to advance the throttle lever of one engine on each side of the airplane, inasmuch as there is sufficient clearance between the face of a camming surface and the opposite inside face of the other lever extension, to thereby permit movement of one lever extension rotationally with respect to the other. This may be seen in Fig. 6 where the throttle corresponding to the right outboard motor RO, has been advanced, imparting rotational movement to the corresponding lever extension 42c in such manner that the beveled end of its interlocked camming surface 43c has caused the interlocking ball 55b to be moved laterally to the left contiguous to the adjacent face of the lever extension 42b. In the position in which the ball 55b is shown in Fig. 6, it is not possible to advance the throttle for the right inboard engine RI corresponding to the lever extension 42b, inasmuch as there is not sufficient clearance for the interlocking camming surface 43b to move past the laterally displaced interlocking ball. For purposes of taxiing on the ground, or for warming-up one of the two engines on the other side of the airplane, it is possible for the pilot to advance the throttle levers of either of the engines on the left side namely, LO or LI corresponding to the lever extensions 42 and 42a, respectively. In Fig. 6, however, these throttle levers for the left side motors are in their "closed" positions and the interlocking ball 55 is shown in its centrally disposed normal position.

The modification shown in Figures 7, 8 and 9 is also directed to a four-engined airplane but in which only one of the four engines can have its throttle advanced at any given time when the control surfaces are locked. This modification also differs in that three ball elements 72, 73 and 74 are used for the four throttle levers, and the balls are disposed contiguously in series rather, than separated by the lever arms as in the previous modification. In Figs. 7, 8 and 9, the interlocking bell-crank element is shown at 65, corresponding to element 52 of the previous arrangement, the bell-crank 65 being pivotally mounted on the shaft 66 upon the housing structure T3. The bell-crank member 65, however, has integrally formed thereon three interlocking arms 67, 68 and 69, as well as a fourth integral arm 70 which serves to limit the movement of the series of balls toward the right. A similar arm 71 is mounted at the opposite end of the assembly to limit the ball movement in the opposite direction, this arm 71 being keyed or otherwise attached to the hub 65a of the bell-crank 65, the key or other fixation means however being releasable in order that the arm 71 may be rotated about the axis of the pivot 66, and angularly with respect to the remaining arms 67, 68, 69 and 70 to permit the interlocking ball elements 72, 73 and 74 to be serviced or replaced. End spacing collars 66a and 66b are disposed on the shaft 66 against the housing T3.

The throttle lever extensions 75, 76, 77 and 78, corresponding to the engines LO, LI, RI and RO, are equally and laterally spaced such that each adjacent pair of lever extensions are disposed to pass between two of the interlocking balls, or between either end ball in the series and the adjacent end arm. Each throttle lever extension is provided with a cutout portion such as 75a, 76a, 77a and 78a open to the periphery of the respective lever member and having the edges of the recess or cutout beveled as at 75b, 76b, 77b and 78b, to permit positioning of the respective interlocking ball elements 72, 73 or 74 within these recesses when the corresponding throttle lever is in the closed position and the control surfaces are locked. As indicated in Figure 7, an external guide element 79 of arcuate form is provided to define the lower movement of the respective interlocking balls when the control surfaces are unlocked and from this figure it will be seen that there is sufficient space between the inner surface of the guide 79 and the periphery of the respective throttle lever extension member to permit the interlocking ball 72 in its unlocked or unblocking position to clear the throttle extension periphery. The modification in Fig. 7 differs from that of Fig. 3 in that the bell-crank arm 65—71 is moved clock-wise to unlock whereas arm 52—54 was moved in the opposite direction to unlock.

The relative arrangement of the elements in Fig. 8 shows the control surfaces in their "locked" condition and the throttle levers in their "closed" position, from which only one of the four throttle levers can be moved. Let us now assume that it is desired to advance the throttle of the right inboard engine RI corresponding to throttle lever extension 77. As the latter is advanced, the beveled recess portion 77a—77b is moved downwardly with the member and when the beveled portion contacts the interlocking balls 73 and 74, the latter are separated laterally such that the ball 74 moves toward the inner surface of the end arm 70, and the ball 73 together with the adjacent ball 72, are moved in the opposite direction toward the inner surface of the arm 71. This lateral displacement of the interlocking balls permits the throttle lever extension 77 to pass between the balls 73 and 74 as shown in Fig. 9, thereby permitting advance of the engine throttle for the corresponding right inboard engine. With the throttle for this engine advanced, however, as shown in Fig. 9, it will not be possible to advance the throttle of any of the remaining three engines, unless and until the throttle 77 is returned to its closed position, because of the blocking effect of each of the balls.

There has, accordingly, been shown and described a throttle interlocking arrangement for a four-engine airplane in which but one engine on each side of the airplane can have its throttle advanced at any given time, and there has also been disclosed a modified version, also for a four-engine airplane, in which but one of the four engines can have its throttle advanced at any given time. The present invention is not, however, limited to the arrangement shown but is equally adapted to any installation of two or more engines in which it is desired to restrict the advance of the throttle to a portion of the engines at any given time while the control surfaces are in the locked condition. Other forms and modifications of the present invention both with respect to the general arrangement and the details of the respective parts are intended to come within the scope and spirit of the present invention as more particularly defined in the appended claims.

I claim:

1. In an airplane, the combination with a plurality of throttle controls for the power plant units thereof and a manual control for the locking of the control surfaces in their neutral positions, of interlocking mechanism including laterally shiftable radially restrained means operatively associated with said manual locking control, and movable into the paths of movement of said throttle controls upon actuation of said manual locking control arranged in the locked condition of said surfaces to permit the advance of but one of said throttle controls.

2. An airplane having a plurality of manual throttle controls for the power plant units of the airplane, a manual control for the locking of a control surface, and interlocking mechanism including freely displaceable means operatively associated with said surface locking control engageable with said manual throttle controls in the locked condition of said control surface arranged in such manner that the advance of not more than one of said throttle controls is permitted by displacement of said freely displaceable means into the path of the remainder of said throttle controls.

3. An interlocking device for the control surface locks and the laterally disposed throttle levers of an aircraft comprising mechanism operatively connected to the control surface locks movable into locking positions in the paths of said throttle levers in the locked condition of the control surfaces, said mechanism including a freely displaceable portion arranged to be laterally displaced upon advance movement of one of said throttle levers into a position in which it blocks the advance of the remaining throttle lever.

4. In an aircraft, a pair of throttle levers arranged for the control of a pair of power plant units, a locking lever operatively connected to locking devices for the control surfaces of the aircraft, said throttle levers having adjacently disposed interlocking portions, mechanism operatively connected to said locking lever including a ball element movable into the paths of said throttle lever interlocking portions in the closed positions of said throttle levers when said locking lever is moved into its locked position, said ball element being displaceable upon advance of one throttle lever in the locked condition of said control surfaces into a displaced position where it blocks the advance of the other throttle lever.

5. In an aircraft, a control surface and throttle interlocking system comprising control surfaces, locks for said control surfaces, a plurality of power plant units, a locking lever operatively connected to said control surface locks, laterally disposed throttle levers separately connected to the respective power plant units, interlock camming surfaces carried by the respective throttle levers, automatic interlocking mechanism operatively connected to said control surface locks arranged to be disposed, in the locked position of said control surfaces, in the paths of the interlock camming surface of each throttle lever, and laterally displaceable means movably carried by said interlocking mechanism arranged to be laterally displaced by the interlock camming surface of an advanced throttle lever to a position in the path of an adjacent throttle lever and to prevent the advance of the remaining throttle levers while said control surfaces remain locked.

6. In an aircraft safety interlocking system including a plurality of control surface locks, a locking lever for said locks, a plurality of throttle levers for the power plant of the aircraft, a pivotally mounted element movable in response to the control surface locking lever, said pivotally mounted member having a plurality of equally spaced transversely apertured arms, a series of ball elements carried within said apertures in said arms, a pair of end elements rotatable with said pivotally mounted member for limiting the transverse movement of said ball elements, throttle control levers intermediately spaced between said adjacent arms and between said end elements and the adjacent arms, said throttle control levers having camming surfaces engageable with an adjacent ball element for its transverse displacement to permit movement of one throttle lever while preventing movement of the remaining throttle levers by said displaced ball elements.

7. In an aircraft safety interlocking mechanism, a plurality of control surfaces, movable means for locking said control surfaces, a pair of throttle control levers operatively connected to power plant units of the aircraft, said throttle control levers having facing interlocking camming portions, an interlocking element movable in response to control surface locking movements, a displaceable ball element floatingly carried by said interlocking element into the paths of either of said interlocking camming portions in the locked condition of the control surfaces and out of said paths in the unlocked condition of said control surfaces, said ball element being limited in its movement by opposed faces of said throttle levers which are spaced apart to such an extent that in the locked condition of said control surfaces but one of said throttle levers with its interlocking camming portion can move past the said displaced ball element at one time.

8. In a safety control system a lever for the locking of a plurality of control surfaces, a plurality of pivotally mounted laterally spaced throttle levers for the control of a plurality of power plant units at least two of which are disposed on each side of the airplane, each pair of throttle levers for the control of the power plant units on the respective sides of the airplane having opposed inwardly facing interlocking portions, means including freely displaceable elements operatively carried by said control surface locking lever having one of said displaceable elements between each of said pair of throttle levers arranged in the locked condition of said control surfaces to cooperate with said interlocking portions in permitting the operation of but one throttle lever in each pair while blocking operation of the remaining throttle levers in each said pair.

9. In an automatic aircraft throttle interlocking arrangement including mechanism for locking a control surface, a pair of throttle control elements each having an interlocking portion, the said control surface locking mechanism having a shiftable means which is moved into the paths of the said throttle interlocking portions in the locked condition of the control surface, said shiftable means arranged to be engaged by an advancing throttle control element and moved out of the path thereof into the path of the remaining throttle control element, such as to block advance of either one, but not both of, said throttle control elements when said control surface is in its locked condition.

10. In an aircraft, an automatic throttle interlock arrangement including a control surface, mechanism for locking said control surface, a pair of throttle control elements for the power plant of the aircraft, the said control surface locking mechanism having laterally displaceable means movable into the path of said throttle control elements in the locked condition of the control surface, said laterally displaceable means of said control surface locking mechanism arranged to block advance of but one of said pair of throttle control elements when said control surface is in its locked condition initiated by the lateral displacement of said means by the advance of the other said throttle control elements.

11. In an aircraft, a safety interlocking system including a control surface, a locking mechanism for said control surface, a plurality of throttle elements arranged for movements between closed and advanced positions for the control of the power plant of the aircraft, and interlocking mechanism including partially restrained spherical means cooperatively associated with said control surface locking mechanism and said throttle control elements arranged to prevent advance of more than one of said throttle control elements from its closed position while said locking mechanism is applied for the locking of said control surface.

12. In an aircraft, a safety interlocking system including: a control surface; a locking mechanism for said control surface; a plurality of coaxially mounted throttle elements arranged for movement between closed and advanced positions for the control of the power plant of the aircraft; and interlocking mechanism including axially unrestrained blocking means cooperatively associated with said control surface locking mechanism and said throttle control elements arranged to prevent application of said locking mechanism for the locking of said control surface while more than one of said throttle control elements is in an advanced position.

13. In an automatitc throttle interlocking arrangement for aircraft: a control surface; mechanism for locking said control surface; a bank of four throttle control elements each having an interlocking portion; the said control surface locking mechanism including a series of laterally shiftable blocking means arranged to be moved into the paths of the said throttle interlocking portions in the locked condition of said control surface; said shiftable blocking means having a total lateral dimension arranged to block advance of all but one of said throttle control elements when said control surface is in its locked condition.

14. In an aircraft, an automatic throttle interlocking system including: a control surface; mechanism for locking said control surface; a bank of throttle control elements; means for separately operating each said throttle control element; laterally shiftable means operatively associated with said control surface locking mechanism movable into the paths of said throttle control elements upon locking of said control surface by said locking mechanism; said laterally shiftable means having a total lateral dimension providing a shiftable clearance space arranged to permit the advance of any one of said throttle control elements upon movement of its operating means and to block advance of the remaining throttle control elements after said first throttle control element has been advanced through said clearance space.

15. In an aircraft: a pair of throttle controls arranged for the control of a pair of power plant units; a movable surface for the control of the aircraft; locking means operatively connected to said control surface for locking the same to the aircraft; said throttle controls having adjacently disposed cam portions; means operatively connected to said locking means including a ball element movable, in the closed position of said throttle levers, into the paths of said throttle control cam portions when said locking means is moved into its control surface locking position; said ball element being displaceable by the cam portion of a first of said throttle controls upon its advance from its closed position in the locked condition of said control surface, said ball element being displaceable into a position wherein said ball element blocks the advance of the other said throttle control by engagement with its cam portion.

16. In an aircraft: a control surface; manual means for locking said control surface; a pair of adjacently disposed laterally arranged throttle control elements having thick portions and thin portions; the respective thick and thin portions of said throttle control elements being opposedly disposed in the lateral sense in the closed positions of said throttle elements; detent means movably carried by said control surface locking means arranged for movement in the lateral sense or away from the opposed portions of said throttle control elements in the locked condition of said control surface; said detent means being of a dimension in the lateral sense such that it may be disposed between the thick portion of a first throttle control element and the opposed thin portion of a second throttle element, but such that it will not fit between the opposed thick portions of both said throttle control elements to thereby prevent movement of the second said throttle control element after said first throttle control element has been moved into an advanced position during the locked condition of said control surface.

17. An interlocking device comprising: a control surface lock; laterally disposed throttle lever means; and mechanism operatively associated with said control surface lock rotationally movable into blocking position in the paths of said throttle lever means in the locked condition of the control surface, said mechanism including a series of laterally displaceable blocking means arranged to be laterally displaced upon rotational advance movement of one of said throttle lever means into a position in which blocking means block the rotational advance of the remaining throttle lever means.

18. In an aircraft, a safety interlocking system including: a control surface; a locking mechanism for said control surface; a plurality of laterally disposed throttle elements arranged for the control of the power plant of the aircraft; said throttle elements mounted for movement from a central closed position to advanced positions both forward and to the rear of said central closed position; and laterally deflectable interlocking means cooperatively associated with said control surface locking mechanism and said throttle control elements arranged to prevent advance in the forward direction of more than one of said throttle control elements from its closed central position while said locking mechanism is applied for the locking of said control surface, said interlocking means disposed at one end only with respect to said throttle elements in the locked condition of said control surface in such manner that the simultaneous reversing movement of all of said throttle elements rearwardly of said central closed position is unopposed by said interlocking means.

19. In an aircraft, a pair of throttle levers arranged for the control of the power plant units of the aircraft, a locking control operatively connected to locking devices for a control instrumentality of the aircraft, said throttle levers having adjacently disposed interlocking portions, mechanism operatively connected to said locking control including a displaceable element movable into the paths of said throttle lever interlocking portions in the closed positions of said throttle levers when said locking control is moved into its locked position, said displaceable element being moved upon advance of one throttle lever in the locked condition of said control instrumentality into a displaced position where it blocks the advance of the other throttle lever, said throttle lever interlocking portions arranged in their advanced positions to block the movement of said displaceable element for preventing the locking of said control instrumentality.

20. In an aircraft: a pair of adjacent throttle controls arranged for the control of the aircraft power plant units, a movable component for the control of the aircraft; locking means operatively connected to said movable component for locking the same to the aircraft; said throttle controls having adjacently disposed cam portions; blocking means slidably associated with said locking means including a laterally unrestrained element movable, upon locking of said movable aircraft component, into the paths of said throttle control cam portions; said slidable element being displaceable from its path by the cam portion of a first of said throttle controls upon its advance from its closed position in the locked condition of said movable aircraft component, said slidable element being laterally displaceable into a position wherein said slidable element blocks the advance of the other said throttle control.

JOHN A. MORRISON.

No references cited.